US006959268B1

(12) United States Patent
Myers Jr. et al.

(10) Patent No.: US 6,959,268 B1
(45) Date of Patent: Oct. 25, 2005

(54) PRODUCT CATALOG FOR USE IN A COLLABORATIVE ENGINEERING ENVIRONMENT AND METHOD FOR USING SAME

(75) Inventors: Kenneth N. Myers Jr., Manassas, VA (US); Galen P. Plunkett, Manassas, VA (US); Jennie D. Beckley, Herndon, VA (US); Debra Ann Mroczek, Warrenton, VA (US); Quynh Anh Nguyen, Herndon, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 743 days.

(21) Appl. No.: 09/666,545

(22) Filed: Sep. 21, 2000

Related U.S. Application Data

(63) Continuation-in-part of application No. 09/631,694, filed on Aug. 3, 2000.
(60) Provisional application No. 60/155,010, filed on Sep. 21, 1999.

(51) Int. Cl.$^7$ .............................................. G06G 7/48
(52) U.S. Cl. ..................... 703/6; 709/205; 709/228; 700/96; 700/97; 700/117; 700/180; 715/727; 715/733; 715/734; 715/741; 715/744; 715/751; 715/753
(58) Field of Search .................... 703/22, 6, 4; 707/9, 707/10

(56) References Cited

U.S. PATENT DOCUMENTS

| 4,875,162 A | * | 10/1989 | Ferriter et al. ................. 705/29 |
| 5,233,513 A | * | 8/1993 | Doyle ............................. 705/7 |
| 5,493,679 A | * | 2/1996 | Virgil et al. ............. 707/104.1 |
| 5,671,360 A | * | 9/1997 | Hambrick et al. ............. 705/9 |
| 5,740,425 A | * | 4/1998 | Povilus ....................... 707/100 |
| 6,049,803 A | * | 4/2000 | Szalwinski ................... 707/100 |

(Continued)

OTHER PUBLICATIONS

Myers, Kenneth N. and Verma Dinesh. "System Design to Affordability in a Collaborative Systems Engineering Environment," Proceedings of INCOSE (1999).*

(Continued)

Primary Examiner—Kevin J. Teska
Assistant Examiner—Thomas Stevens
(74) Attorney, Agent, or Firm—Whitham, Curtis & Christofferson, P.C.

(57) ABSTRACT

A collaborative engineering environment (CEE) enables the effective capture, management, communication, and exploitation of all product related information to a project team. The systematic employment of this information offers substantial improvements in productivity, cost savings, cycle time reductions, product integrity, and lifetime supportability of the system. Advanced CEE capabilities exploit and leverage the engineering, architectural and technological expertise of enterprise subject matter experts (domain experts) across multiple complex systems development and integration activities. The CEE provides a tightly coupled process automation using reusable product elements for coupling information with engineering processes and ensuring adherence to repeatable and traceable engineering processes. A product catalog provides a single information management point for intrinsic complex product characteristics and facilitates the propagation of that information to engineering teams incorporating the complex product into their system designs. The intrinsic complex product characteristics are augmented with implementation specific information to fully describe the complex product in the system design.

20 Claims, 10 Drawing Sheets

U.S. PATENT DOCUMENTS

| | | | | |
|---|---|---|---|---|
| 6,075,539 | A * | 6/2000 | Ishida et al. | 345/419 |
| 6,115,690 | A * | 9/2000 | Wong | 705/7 |
| 6,138,121 | A * | 10/2000 | Costa et al. | 707/100 |
| 6,151,601 | A * | 11/2000 | Papierniak et al. | 707/10 |
| 6,175,838 | B1 * | 1/2001 | Papierniak et al. | 707/203 |
| 6,295,513 | B1 * | 9/2001 | Thackston | 703/1 |
| 6,466,935 | B1 * | 10/2002 | Stuart | 348/143 |
| 6,499,001 | B1 * | 12/2002 | Meyer | 702/187 |
| 6,501,501 | B1 * | 12/2002 | Miyazawa | 348/143 |
| 2002/0188927 | A1 * | 12/2002 | Bellagamba | 717/101 |
| 2003/0050859 | A1 * | 3/2003 | Rodriguez et al. | 705/27 |

OTHER PUBLICATIONS

Myers, Kenneth N. and Beckley, Jennie. "A Web-Centric Collabortive Engineering Environment for Product Centered Lifetime Support." Proceedings of the INCOSE Mid-Atlantic Regional Conference, (2000).*

PCT WO 0167279 A2 Integrated Business System for the Design, Execution, and Management of Products Sep. 13 (2001).*

Myers, Kenneth N. and Mimi Nguyen. Exploiting the Collaborative Engineering Environment as a Critical Resource Multiplier (1998).*

Moertl et al. Reengineering a Cardiology Information System for Internet Use and Web Technology (1997). Computers and Cardiology, vol. 24 (p. 275-278).*

Lockheed-Martin. Best Manufacturing Practices. (Aug. 2001) College Park, Maryland (p. 4).*

Lincke et al. Mediating Electronic Product Catalogs. (Jul. 1998) Communications-of-the-ACM. vol. 41, No. 7 (p. 86-88).*

Nafito-M. The indexed Web: Engineering Tools for Cataloging, Storing and Delivering Web-based Documents (Feb. 1999). Infromation-Outlook. vol. 3, No. 2 (p. 18-23).*

Schmitz- et al. Implementation of a Catalog and Retrieval System for the Nation Engineering Education Delivery System (NEEDS). Jan.-Mar. 1994). (vol. 4, No. 1 p. 33-41).*

McQuay-W.K. "A Collaborative Engineering Environment for $21^{st}$ Century Avionics" IEEE Aerospace Conference 1998. p. 225-262.*

Hara-H et al. "Model-based Architecture for the Internet" INSPEC. COMPSAC'97 Washington D.C. Aug. 1997. p. 182-187.*

Standridge et al., "Progress in Modular Simulation Environments" 1996. p. 714-720.*

Salomons et al., "Conceptual Graphs in Constraint-based Re-Design". 1995. p. 55-64.*

* cited by examiner

PRODUCT CATALOG FOR USE IN A COLLABORATIVE ENGINEERING ENVIRONMENT AND METHOD FOR USING SAME

CROSS-REFERENCE TO RELATED APPLICATIONS

This application is a Continuation in Part and claims priority to U.S. patent application Ser. No. 09/631,694, entitled "Collaborative Engineering Environment For Product-centered Lifetime Support," filed by K. Myers, J. Beckley, D. Mroczek, Q. A. Nguyen, G. Plunkett and D. Verma on Aug. 3, 2000 and assigned to a common assignee, the entire subject matter of which is incorporated herein by reference. This application also claims priority to Provisional Patent Application Ser. No. 60/155,010 entitled "Exploiting the Collaborative Systems Engineering Environment as a Critical Resource Multiplier" filed by K. Myers, M. Nguyen, J. Beckley and D. Mroczek on Sep. 21, 1999, the entire subject matter of which is incorporated herein by reference.

DESCRIPTION

BACKGROUND OF THE INVENTION

1. Field of the Invention

The present invention generally relates to tools used for engineering environments and, more particularly, to a Collaborative Engineering Environment (CEE) which provides a multi-disciplinary engineering team with immediate access to all relevant product information and uses a product catalog of reusable and customizable elements available to the projects within the enterprise.

2. Background Description

Enterprise systems can include not only the systems engineering and design disciplines, but also the customer and industry program management, procurement, manufacturing, production, maintenance, user, training, and operations disciplines. Concurrent engineering teams with varying membership from these disciplines will interact with a product's information during its life cycle.

Traditional engineering approaches are based on a document-centric model of information exchange. These approaches introduce communication inefficiencies in multi-disciplinary concurrent engineering teams that are in a rapidly evolving design environment. Once a design has stabilized (into a "baseline"), inefficiencies arise from searching for the required information. Furthermore, at all times, engineers must translate information from design documentation into and out of their domain specific toolsets, introducing data translation latencies and errors and often times making incorrect or improper decisions based on out of date information. After a product has been produced, substantial information regarding design decisions is lost, introducing inefficiencies in supporting the product.

Many current commercial-off-the-shelf (COTS) product data management (PDM) systems offer basic product structure management, life cycle management, document management, configuration management, workflow management and administrative capabilities required by an engineering organization. These capabilities are all supported through various underlying information models describing the product under consideration. Engineering tool interfaces are limited to computer aided design/computer aided manufacturing (CAD/CAM) tools or document file-centric interfaces such as text editors, word processors, spreadsheet tools, presentation tools, and selected external databases. Interfaces with other systems are based on interchange standards that focus on mechanical and structural aspects of the system.

Full functional web-centric PDM system products are now emerging to support widespread user access, easily managed deployment, and large scale integration of the PDM environment with other information management systems such as PDM systems, enterprise resource planning (ERP) systems, electronic commerce, and COTS PDM toolsets.

Many unique requirements associated with complex electronic systems are not supported by current COTS PDM products. Associative representations of the physical, functional, and operational information describing the complex electronic system are not supported. Related scheduling, costing and infrastructure descriptions cannot be associated, as well. Interfaces with engineering tools that create or use this information do not exist.

Available catalog functionality is limited to commercially available mechanical components typically utilized in computer-aided design (CAD) tools with the information periodically updated by a proprietary service. The ability to reflect associative physical, functional, operational, scheduling, performance, reliability, technology, costing, modeling, and other information through the catalog cannot be supported. Information from other enterprise systems such as financial systems cannot be interfaced to the catalog to be reflected in the applications referencing the catalog. Projected or "hypothetical" components are not supported by existing catalog systems.

SUMMARY OF THE INVENTION

It is therefore an object of the invention to utilize the advances in product data management (PDM) technologies and other commercial-off-the-shelf (COTS) system elements to build a user-friendly collaborative engineering environment (CEE) to reflect the complex electronic systems integration domain and to allow for lifetime support of the products developed by utilizing the CEE.

It is another object of this invention to provide an engineering information management system that provides interactive access to all aspects of the managed design baseline(s), including information capture, creation, update, deletion, management and automated interfaces to multi-disciplinary toolsets. Immediate access to the latest product information, as well as access to all associated information, tools, models and simulations enables greater visibility and more rapid turnaround of design alternatives and options assessments. At the same time, decisions can be obtained with a higher level of confidence when the evaluated trade-offs include a greater scope of pertinent design parameters than previously possible.

It is another object of this invention to provide a "product catalog" where engineering disciplines reference an extensible set of intrinsic product information from a single logical product information management point, enabling timeliness, currency, reuse, consistency, and integrity of the information across a product design team or multiple product design teams across an enterprise. The flexibility to augment the intrinsic information with design dependent information to fully describe the product within the context of the system design further leverages these benefits. The lack of these capabilities is a significant shortfall in the systems in the prior art.

It is another object of the invention to provide a tightly coupled process automation using reusable product elements for coupling information with engineering processes and ensuring adherence to repeatable and traceable engineering processes.

It is another object of the invention to provide increased multi-disciplinary information integrity, reduced cycle time, design-centric engineering, and interactive enabling of concurrent engineering. Low cost engineering assessment and design relevance is also provided through reduced information manipulation. Multi-disciplinary engineering tools such as custom total ownership cost estimation, commercial cost estimation, performance analysis, stochastic modeling (e.g., SPAR™ predictive modeling tool available from Clockwork Group of Herzliya, Israel or Tiger available from the U.S. Government), requirements traceability, COTS Assessment and Selection Tools (CAST™, available from Lockheed Martin Naval Electronics and Surveillance Systems, Manassas, Va.), are enabled through bidirectional automated information mappings between the tool and the information model managed in the underlying CEE (collaborative engineering environment). This allows for information capture from the native engineering toolset and tightly couples the engineering tools to a rapidly evolving design set, enabling concurrent engineering through a controlled evolution of design. (SPAR™ is a trademark of Clockwork Group of Herzliya, Israel. CAST™ is a trademark of Lockheed Martin Corporation.)

It is another object of this invention to provide an environment where many disparate tools in different domains are easily integrated by using the same base information.

According to the invention, use of COTS is maximized through the systematic capture, management, communication and exploitation of all associated product information across an engineering community. The systematic reuse of managed information regarding current and projected product characteristics, such as performance, cost, technology, interfaces, availability, and maturity, across multiple projects offers substantial improvements in engineering productivity, cost savings, cycle time reductions, product integrity, and supportability of the system.

A computer implemented web-centric collaborative engineering environment (CEE) provides an inter-enterprise collaborative mechanism for organizations developing and maintaining complex system products. The CEE provides a federated architecture linking multiple systems and applications together to enable collaboration among enterprise members. At the base of the CEE is an object oriented database managing an associative object model (product model) for providing a persistent understanding of product and program information, assets and tools available in the enterprise.

The CEE is built on a framework for collaboration to provide access control, security, search mechanisms, concurrency control, versioning, information structuring, information mapping and exchange. The collaboration is accomplished by linking members of the enterprise with information in the database, where the information available to each member is information necessary for that member to complete role and team based tasks. The means for linking comprises a plurality of tools where each tool communicates information with the object oriented database. Each member communicates with the enterprise for collaboration using a standard web interface where the web interface is instantiated for specific programs, roles and teams. Members complete their domain related tasks using tools specific to their domain, e.g., domain model. The domain-based tools are integrated with the object oriented data base by a combination of data conversion tools, input/output forms, report generators, automated workflows and associative data models.

Each domain model is developed from the life cycle perspective. Each domain model overlays system views (functional, physical, operational) and system schedules (development, production, technology refreshment/insertion, support, platform availability) with the infrastructure of the program (development, production, support). Within the domain architecture are defined relationships and standard parameters that often can be dynamically modified for different programs, projects, or teams.

The domain models are integrated with the collaboration layer so that interested parties have immediate access to the current system baseline information in authorized domain areas. Access to all information, tools, models and simulations associated with the system development on a program are also available immediately to interested parties, thus guarding the integrity of the system by eliminating information defects.

At the heart of the preferred embodiment of the present invention is the "product catalog". The product catalog provides the capability within the CEE that facilitates communication and enterprise reuse of product related information to the multiple engineering disciplines and programs. Through a process of maintaining the product catalog, technologists, product specialists, domain specialists (e.g., cost engineers, reliability engineers) and system or software architects propagate a product's information to a larger user community through a single information entry point. Users utilize current, accurate and complete product information by referencing parts from the product catalog to build a product model for their program. Maintaining both the product catalog and a program's product model within the CEE enables collaborative multi-disciplinary activities, such as life cycle cost assessment, spares projections, performance analysis, and program status tracking. Other benefits of the present invention include information reuse, timeliness of information, currency of information, information integrity, and information consistency. The present invention allows for the extended definition of part information in the context of the design. This allows for the listed benefits but extends them further by leveraging into the design context. An example is that mean-time-between-failure information can be leveraged into two (2) unique application environments to assess the performance of the same part in two (2) different environments, such as airborne and industrial. In this way, scarce subject matter expertise can be shared, leveraged and exploited in an efficient and reliable manner within the unique constraints of the rapidly changing COTS technological environment.

The present invention also allows for the selective override of catalog part information in a specific design. This provides the listed benefits of the catalog with additional flexibility based on unique program requirements.

In the preferred embodiment, parts can be composed of "leaf level" parts (inseparable components) or structured hierarchies of parts (separable components such as: assemblies, subsystems, etc.). These can be software components as well as hardware components. It would be apparent to one skilled in the art how to include other components such as functional components, human components, or operational components, as well. All types of components, whether physical or abstract, should abstractly assume the comparable behavior.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The collaborative engineering environment (CEE) of the present invention provides an inter-enterprise collaborative mechanism for system integrators, subcontractors, teammates, suppliers, partners, users and customers. It provides a federated architecture linking multiple systems and applications together to enable collaboration to conceive, develop, produce, sustain and retire complex system products. Critical information is made readily available to every member of the extended enterprise.

Figure 1:
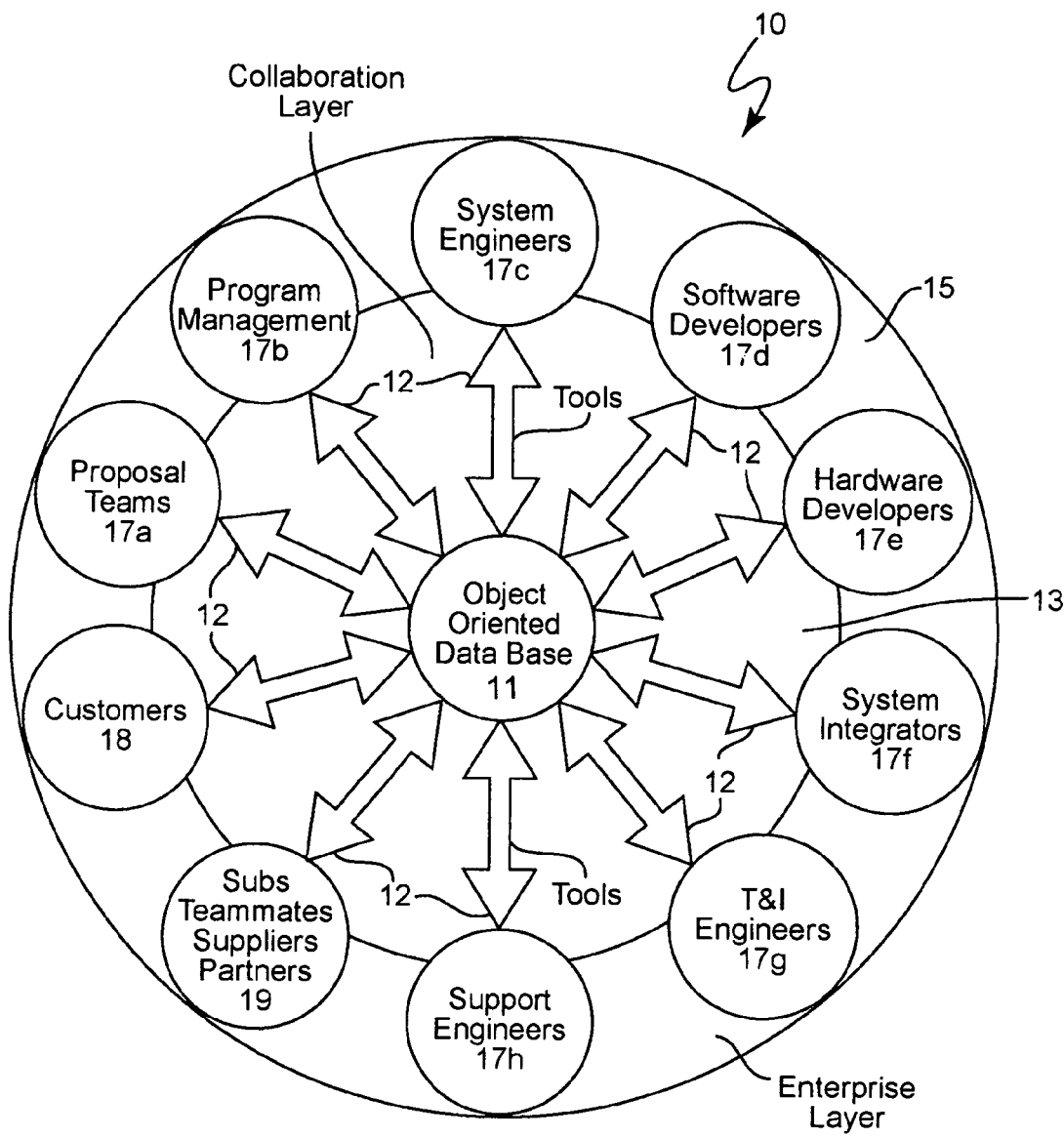
FIG. 1 is a high level conceptual drawing of a collaborative engineering environment (CEE) according to the invention.

Referring now to the drawings, and more particularly to FIG. 1, there is shown a conceptual overview of the preferred embodiment of a CEE. An associative object model managed within an object oriented database 11 provides a persistent understanding of the product information assets. The associative object model is also referred to as the "product model." A collaboration layer 13 provides access control, security, search, workflow automation, ownership, access control, concurrency control, versioning, information structuring, information mapping and exchange, and other capabilities to link members of the Enterprise 15 with the information they need, using the appropriate tools 12 for their domain area. Workflow automation is also provided within the collaboration layer 13 to provide the linkage of team members 17, 18 and 19, information and business processes. Enterprise members provide expertise in a variety of domain areas. For instance, proposal teams 17a, program management 17b, system engineers 17c, software developers 17d, hardware developers 17e, system integrators 17f, testing and integration engineers 17g, support engineers 17h, members external to a development organization (e.g., subcontractors, teammates, suppliers and partners) 19, and customers 18 all play a part in the enterprise. In the preferred embodiment, members interact with the CEE through familiar web interfaces and engineering tools with the presentation structured for the appropriate domain.

Engineering has traditionally been a document-centric activity. Drawings, bills of material, specifications, software and system designs, test plans, training manuals, user manuals, etc. convey the information between the various communities and domains. By placing product information at the center of the system life cycle, tightly coupled multi-disciplinary and enterprise member interactions are facilitated. This associative information model of the product is referred to as the "product model."

An associative information model (product model) is defined for the enterprise. This product model is the basis for a database schema to include all data defined for use in implemented domains and tools in the CEE. It may include additional data, as desired. System physical descriptions, system functional descriptions, system operational descriptions, system environment descriptions and system schedules are defined in the product model. Thus, the product model contains a complete specification of the system. While the preferred embodiment is to implement all domains in an enterprise as members of the CEE, domains may be incrementally added to the CEE as time and funds permit. A CEE comprising only a subset of all domains in the enterprise is an advantage over limited systems of the prior art which provided minimal cross-domain collaboration. As a minimum, the product model need only contain the essential "independent" data for implemented domains. "Dependent" data may be generated on an as-needed basis using the independent data contained in the database.

Figure 2:
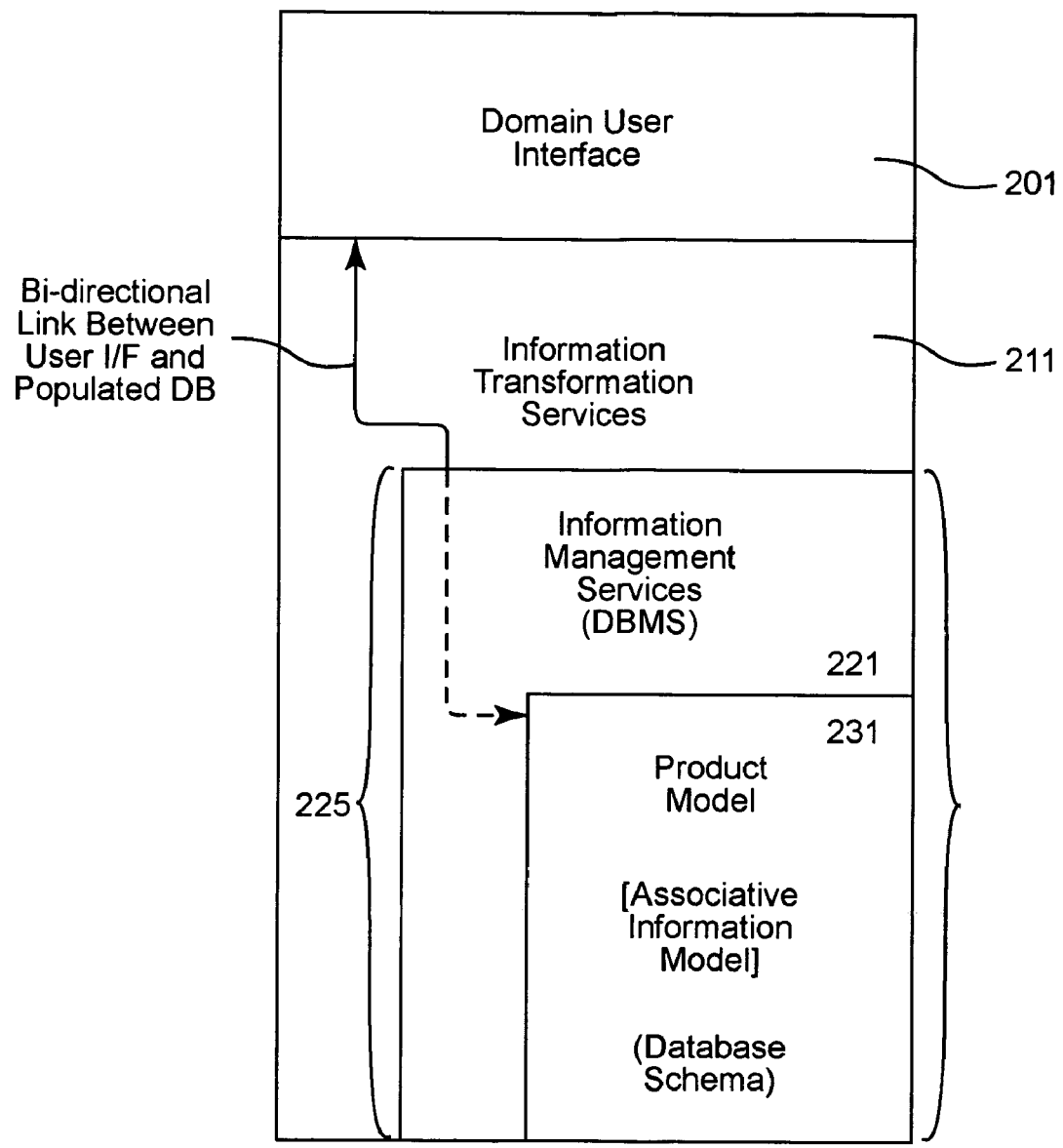
FIG. 2 shows a high level conceptual diagram of the interaction between a domain area and the product model.

Referring now to FIG. 2, there is shown a conceptual diagram of the interaction between a domain area and the product model. A member of the enterprise interacts with the CEE via a domain user interface 201. The preferred embodiment of this interface, as described further below, is via standard web browsers. Enterprise members require various tools to complete their domain tasks. The set of tools required is dependent on the domain, i.e., systems engineering, logistics support, program management, etc. Access to automated tools is made available through the domain user interface. For instance, a software manager may choose to view or update the software requirements traceability matrix for a program using DOORS® available from Quality Systems and Software, Inc., Mt. Arlington, N.J. The data required to execute the desired task is pre-defined. The information transformation services layer 211 acts as a bidirectional link between the user interface and the populated CEE database. Previously stored data in the database, according to the associative information model (product model) 231, is retrieved by the information management services layer (nominally a database management system) and then transformed by the information transformation services into a format that can be used by the selected tool, i.e., in this case DOORS™. A similar process in utilized for updating or storing new data generated by a domain user. (DOORS® is a registered trademark of Quality Systems and Software, Inc., Mt. Arlington, N.J.)

Figure 3:
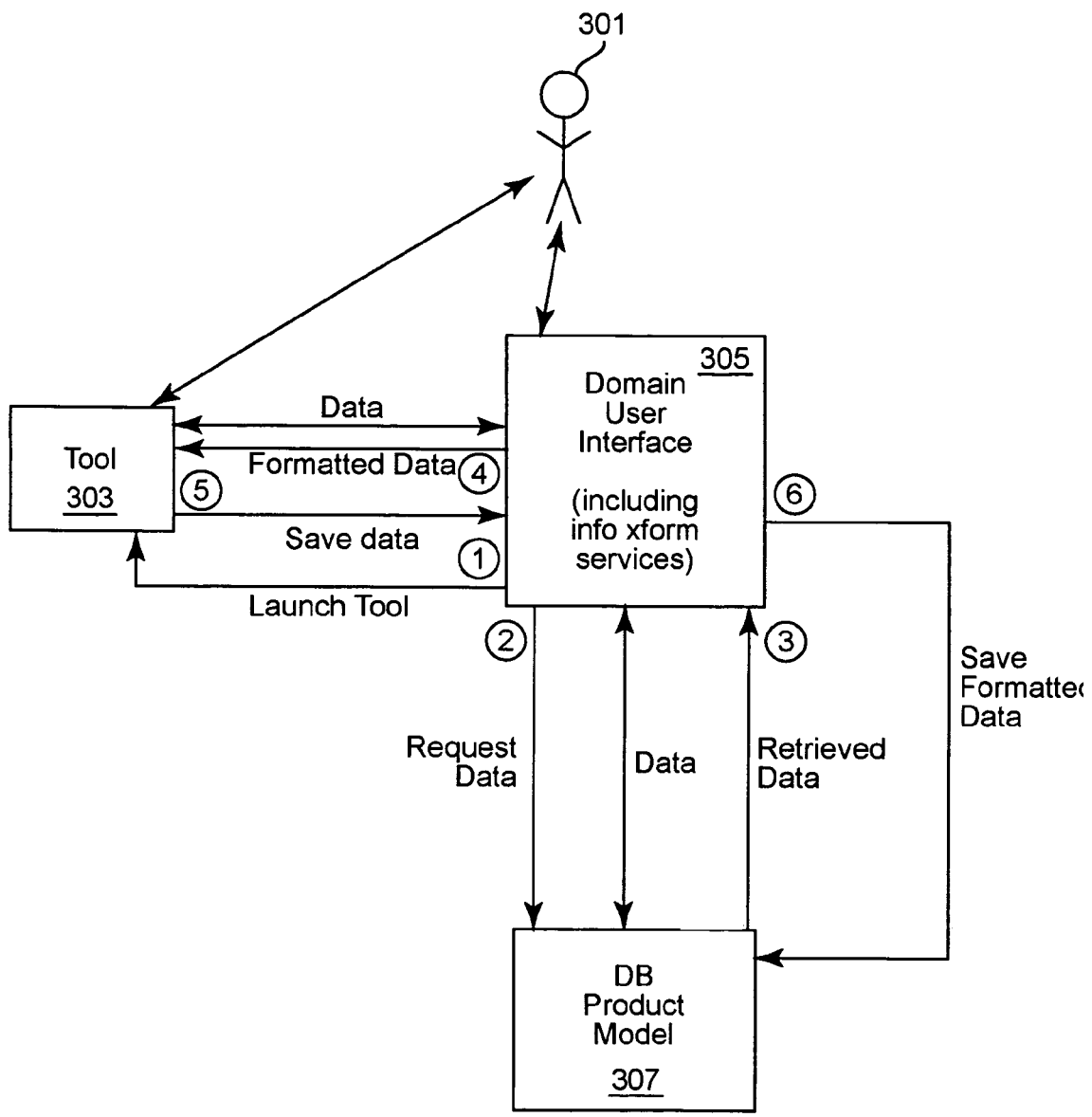
FIG. 3 shows a simplified data flow through the CEE.

Referring now to FIG. 3, there is shown a simplified data flow through the CEE. A user 301 selects a tool 303, preferably through the domain user interface 305 which then launches the tool. The transformation services, shown here as part of the domain user interface 305, request the data from the database 307. The retrieved data is then transformed and passed back to the tool 303. If the user 301 desires to save updated information, the raw data output by the tool 303 is sent to the information transformation service, herein shown as part of the domain user interface 305, which formats it for storage in the database 307. The formatted data is then saved in the database and immediately available to other users. The information management services layer (not shown) handles access control, concurrency, versioning, etc. in order to provide necessary configuration management of the enterprise data.

Figure 4:
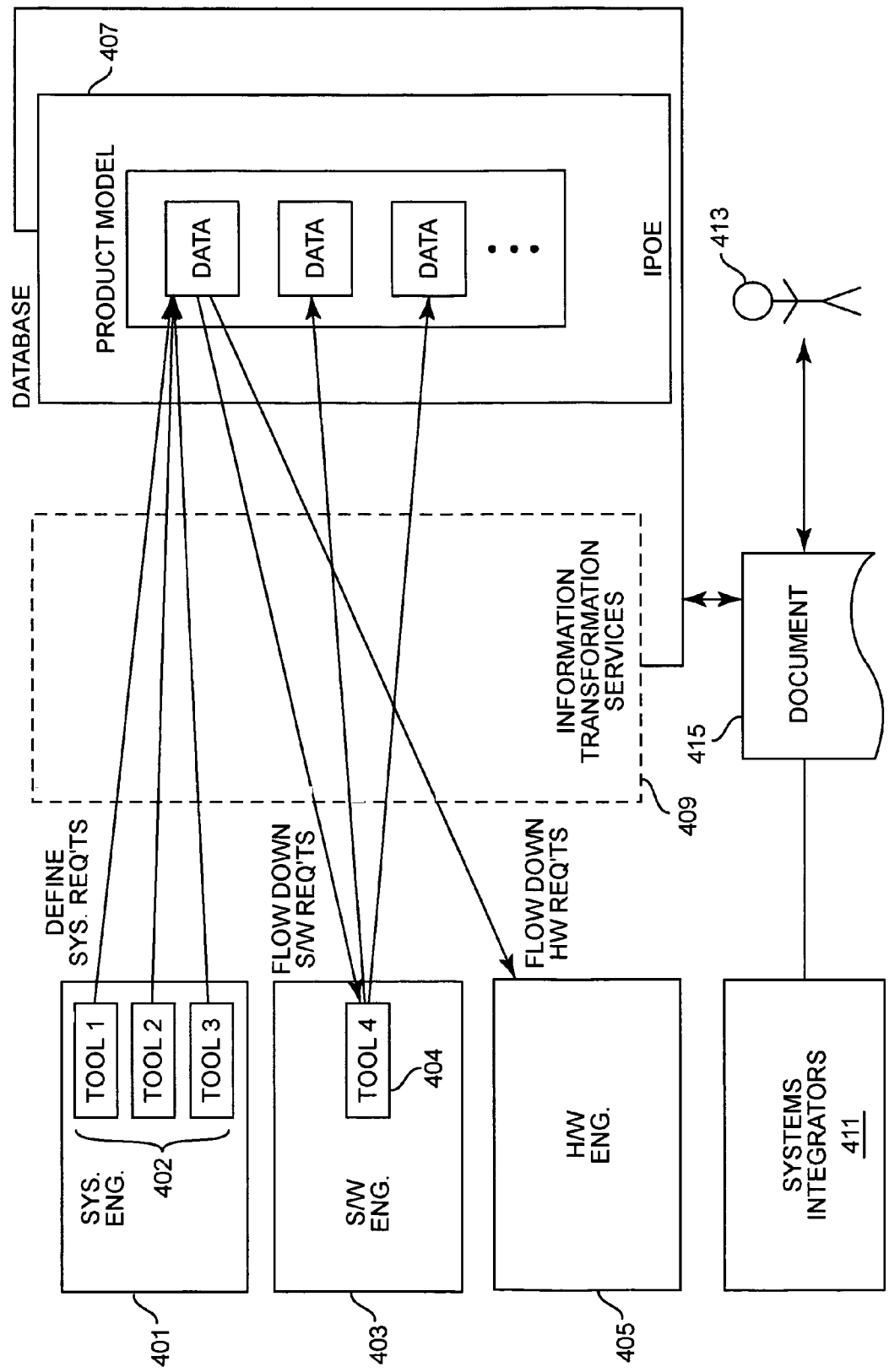
FIG. 4 shows a view of the interaction between domain areas and the database, or integrated product data environment (IPDE), as defined by the product model, within the CEE.

FIG. 4 shows another conceptual view of the interaction between domain areas and the database, or integrated product data environment (IPDE) within the CEE. Members of the system engineering domain 401 utilize a variety of tools 402, for instance to define system requirements. Data related to the system requirements are saved in the database 407, according to the product model, via the information transformation services 409. The information transformation services 409 does all of the filtering and transformation of data and requests for read/write into the database. Software engineering 403 utilizes a tool 404 which uses the data generated by the Systems engineering domain 401 in order to flow down the software requirements. The required data is retrieved from the database 407, as needed to populate the tool 404. The software requirements generated by the tool 404 are then saved in the database 407 for use by other members of the enterprise. Hardware engineering 405 would also retrieve the data stored by system engineering in order to flow down the hardware requirements. It is not necessary for Software engineering 403 and hardware engineering 405 to utilize the same tool, or the exact set of data with respect to defining requirements. The data sets are defined by the product model for the enterprise domains implemented in the CEE. Suppose that the system integrators 411 are not integrated into the CEE. A system integrator user 413 uses traditional methods of data transfer, such as paper documents 415, to communicate and collaborate with other members of the enterprise.

The inventors developed an early prototype embodiment of the CEE to serve as the proof of concept for the entire CEE. A prototype framework for the CEE was developed that could accommodate a subset of the enterprise domain areas and was integrated with a database and PDM to provide a pilot system enabling a systematic execution of cost-as-independent-variable (CAIV) for COTS-intensive complex electronic systems. This prototype is discussed in copending U.S. patent application Ser. No. 09/631,694, supra, herein incorporated by reference. The present invention builds on lessons learned during the prototype development and provides trade-offs in design and function based on the pilot system.

In developing a CEE, considerable attention must be placed on the specification of the product model. Domain experts and high level managers in the domains selected for integration in the CEE must participate in the analysis process to specify the requirements for the product model. For the preferred embodiment, this was done using the Catalysis Object-Oriented (OO) methodology as described in D. D'Souza and A. Wills, "Objects, Components and Frameworks with UML: The Catalysis Approach" (Addison-Wesley, Massachusetts, 1998), herein incorporated by reference, to specify requirements for the system. Among other things, Catalysis extends the Object Modeling Technique (OMT) (see J. Rumbaugh, et al., "Object-Oriented Modeling and Design" (Prentice Hall, Englewood Cliffs, N.J., 1991), herein incorporated by reference) with a rigorous specification of the behaviors of the system being modeled. The system requirements must be captured and documented. For the prototype the Rational Rose toolset, available from Rational Corporation, was used to capture and document the requirements using both the Unified Modeling Language (UML) and Object Constraint Language (OCL). These captured requirements were mapped into the PDM database schema and utilized to build the software product model framework and custom applications.

Experience from the pilot was folded into an improved PDM tool requirements specification, which resulted in the choice of Parametric Technology Corporation's Windchill™ tool to provide foundational PDM capabilities targeting production deployment. The Windchill™ tool is built on an Oracle® 8i database, and provides an out-of-the-box persistence infrastructure that obviates the need to develop one's own. It incorporates the Rational Rose modeling tool, and augments the Rational Rose product's native code generation capability to generate a significant amount of Windchill™ tool specific Java™ software as well as the corresponding database schema for the product model. The architecture used by the Windchill™ tool is web-centric. This facilitates sharing of information among distributed sites (such as customers and contractors) and requires no special client software installation beyond a web browser. The Windchill™ tool is also built to be extended. It provides an extensive Java™ class library as a foundation for custom development. It already includes, for example, a product model "part" class with basic functions and a graphical user interface. While extending the "part" class to support attributes needed by applications such as CAIV still requires custom development, the necessary effort and how the part fits into the Windchill™ tool's framework is well defined. (Windchill™ is a trademark of Parametric Technology Corporation. Java™ is a trademark of Sun Microsystems, Inc.)

The preferred embodiment of the CEE is characterized by attributes that provide further definition of the concept, as well as the high level requirements.

Referring again to FIG. 1, the CEE 10 is an enterprise information management system used to manage product information assets. The enterprise includes a target organization, for instance System Engineering 17c, other related organizations within the enterprise 17a, 17b, 17d–h, customers 18, users and maintainers (not shown), and teammates, subcontractors, and suppliers 19. Virtual enterprises are also defined in the program dimension. In addition to exploiting consistency and economies of scale at a company level, the CEE integrates with other enterprise systems. In one dimension is the "corporate" enterprise which captures the superset of information management systems, other organizations, information assets, tools, personnel, etc. supporting the business. In the second dimension is a subset of the corporate enterprise comprising a "program" or project. A "program" integrates a team of people towards a shared objective, such as to produce a product or provide a service.

Figure 5:
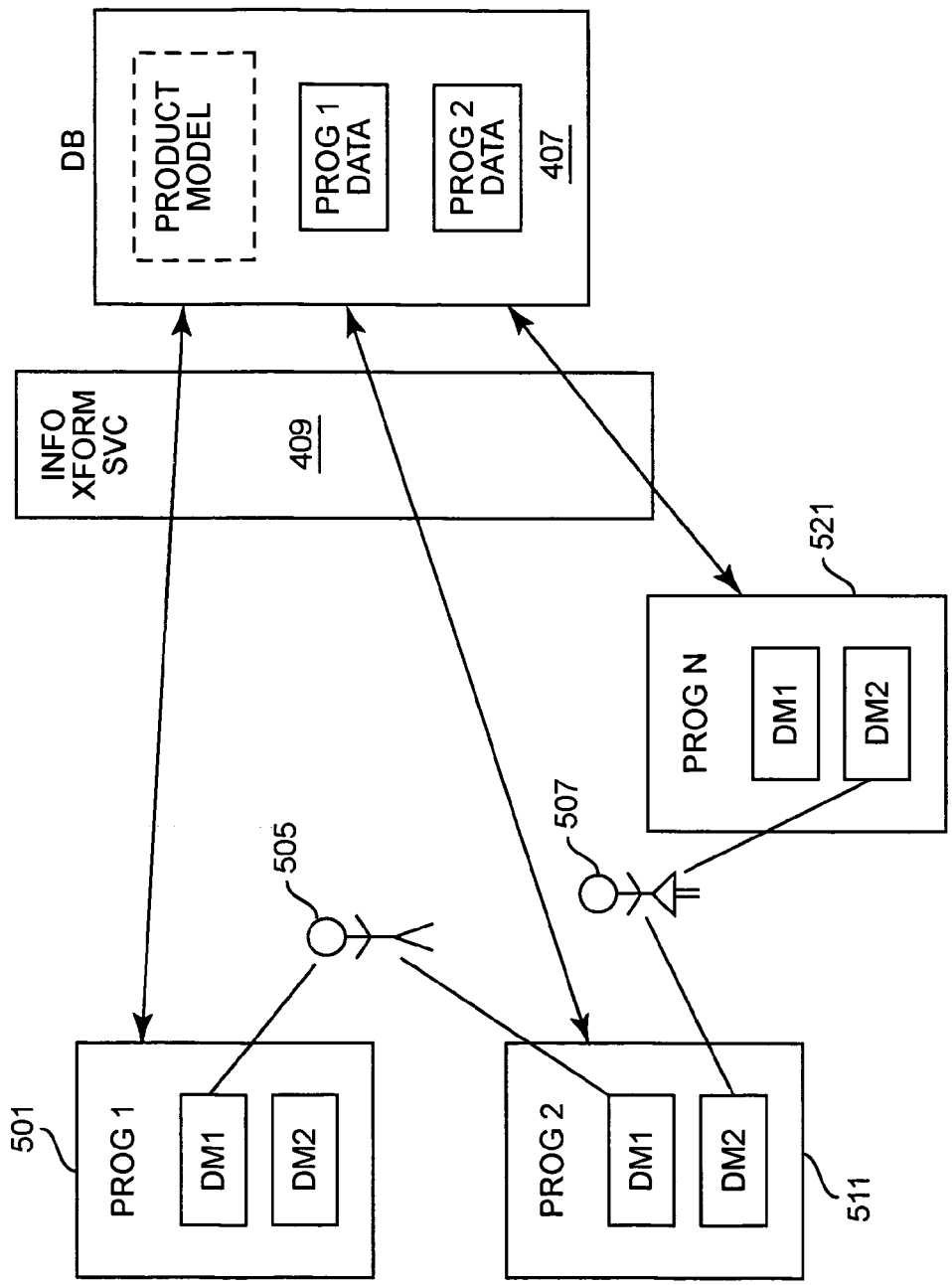
FIG. 5 shows a view of a CEE comprising data for more than one program.

The CEE architecture enables the rapid creation of multiple virtual enterprises within a program or strategic partnership context. Referring to FIG. 5, there is shown a federated architecture of a CEE comprised of multiple programs. Through this federated architecture, information, team members, system, applications and processes throughout the virtual enterprise are electronically integrated. Product and process knowledge is shared regardless of its native format. A user 505 contributes to both Program 1 (501) and Program 2 (511) in a specific domain (DM1). Another user 507 contributes to both Program 2 (511) and Program n (521) in a specific domain (DM2). The programs are within the same enterprise. Therefore, efficiencies are gained by providing a standard domain user interface and a common database for the same user across multiple programs. The product model, as implemented in the database schema, segregates the data by program. A property is added in the product model that captures the concept of programs and uniquely identifies each datum with its corresponding program or programs. This feature provides finer grained access controls, program process intelligence and additional reuse capabilities.

The CEE provides interactive access to product information assets for all members of the virtual enterprise. Engineers have access to the latest information; program managers have insight into the current state of the product and customers; teammates and suppliers can interact with a master representation of the product information.

Referring again to FIG. 1, engineering tools 12 are interfaced with product information 11 to provide synchronization with an evolving design. Information is both generated within the tools 12 and utilized by them. Multiple tools and interfaces may participate in specifying the product. Synchronizing performance analysis, requirements traceability, modeling and simulation, trade study, and other engineering tools with a dynamic evolving design offers substantially increased engineering efficiencies and product integrity while reducing risk and cycle times. One object of the invention is to integrate 'best-of-breed' tools and practices into the CEE, thereby leveraging that investment into the organization. The product model concept provides an encapsulated design mechanism for information exchange between multiple disparate toolsets.

The CEE is intended to facilitate the systematic reuse, exploitation, and leveraging of the information assets generated for the systems produced by the organization. This information includes all designs, documentation, rationale, history, and associated knowledge developed or utilized during the product life cycle. Reuse is supported at the program and enterprise levels.

The CEE facilitates process consistency across the organization and across programs through an encapsulation of the organizational and program specific business policies. Its federated architecture supports the consistent and flexible integration of external organizations. Workflow automation can be instrumented for metrics collection, assessment, and process refinement.

Enterprise reuse enables the leveraging of scarce critical resources across the enterprise. By enabling subject matter experts to systematically propagate their knowledge across the organization, their expertise can be multiplied throughout an organization, or company. This is critical for COTS-intensive complex systems where rapidly evolving technologies, cost pressures, and short product lifetimes are demanding these efficiencies. This concept also acts as an enabler for short cycle time processes such as systems architecting and proposal generation where substantial collaboration is required.

In the preferred embodiment, a product catalog is implemented for the enterprise. The product catalog is founded on the associative information model principles of the CEE. It enables the exploitation of multi-disciplinary reuse. A product model is defined for the enterprise to include elements, or parts, which are candidates for reuse across programs. In a hardware context these elements could be simple parts such as memory chips or complex parts such as a microprocessor (which includes multiple simple parts), or assemblies such as a commercial server. An element can be an intangible or abstract part, as well, for instance, a process description defining an operational activity or a set of data related to software design. The product catalog holds the default definitions for the defined elements and allows access, customization and instantiation of the elements by programs.

The CEE protects information from unauthorized access based on business policies across the program or company. COTS security mechanisms may easily be exploited using the information management services layer, based on enterprise or program requirements.

CEE users consist of both "power" and "casual" users. Both communities are to be enabled through their domain user interfaces with the CEE.

In order to exploit the benefits of a CEE, it must be easy to manage and sustain. This includes the software basis of the system, the production environment, and the information that it manages. As the product model evolves, existing information must be efficiently migrated in parallel with the advancing capabilities of the CEE.

The CEE provides a framework supporting the evolution of the engineering enterprise as well as the integration of engineering tool advances. Tools, processes, and product content may be driven by external forces such as the customer. The CEE provides the basis for an ongoing evolution and is supported by the established framework.

The CEE provides the flexibility to be tailored to a diverse set of program requirements. Programs could range from small internal research and development (R&D) projects to large complex systems integration programs consisting of many subcontractors and suppliers. Within the organizational policies, the CEE must consistently capture the rules of business while providing the flexibility to be tailored to support the individual requirements of specific programs.

To accomplish these requirements, in the preferred embodiment, Parametric Technology Corporation's Windchill™ product was selected to provide the CEE infrastructure. The Windchill™ product provides a highly customizable web-centric environment for inter-enterprise collaboration, as well as industry leading solutions for document management, structure management, life cycle management, workflow management, product structure management, change management and collaborative product commerce.

While targeting the manufacturing domain, the rapid development environment of the Windchill product enables the quick deployment of comparable applications tailored for the complex electronic systems integration domain. In addition, the underlying product infrastructure is exploited to develop advanced applications combining information, process, and engineering toolsets into highly automated activity-oriented engineering applications.

Figure 6:
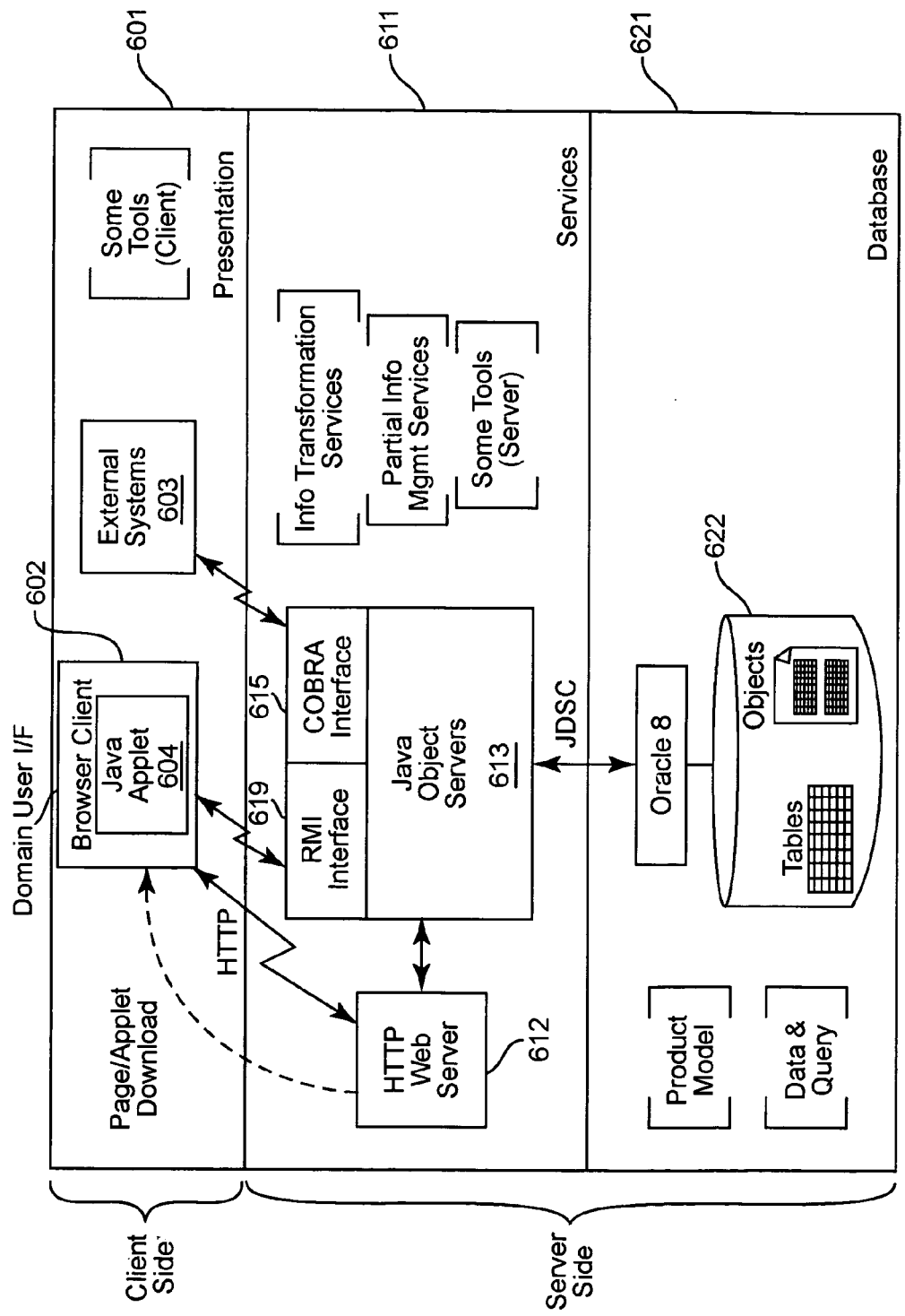
FIG. 6 show a three-tiered architecture for the Windchill™ Product Data Management (PDM) product as used in the preferred embodiment of the present invention.

Referring now to FIG. 6, there is shown the three-tiered web-centric Windchill™ tool architecture. The preferred embodiment is implemented using client/server technology where some functions are distributed to a server and some functions are allocated to clients. Multiple clients are typically used to provide access for members of the enterprise in distributed locations. It would be apparent to one skilled in the art that functions typically implemented on a single server could be distributed to more than one server or that the database could be distributed over more than one server. The presentation tier 601 uses commercial web browsers 602 to execute a combination of HTML (HyperText Markup Language), JavaScript and Java™ applets to accomplish discrete user tasks. Any user with a Java™ capable browser such as Netscape® Communicator or Microsoft® Internet Explorer, can access the preferred embodiment of the CEE. This presentation tier is implemented on the client-side and contains the appropriate domain user interface(s) and may contain a variety of client-side domain tools. (Netscape® is a registered trademark of Netscape Communications Corporation. Microsoft™ is a registered trademark of Microsoft Corporation.) The services tier 611 is implemented on the server side and provides the business logic supporting business transaction processing. This functionality is provided by commercial HTTP (HyperText Transfer Protocol) servers 612 and the Windchill™ tool method servers 613. Custom software provides additional CEE functionality for the information transformation service layer. The services layer communicates with the database using information management services. Some domain tools may reside here on the server side, rather than the client side, if desired. It would be apparent to one skilled in the art that some functions of the information transformation service may be implemented on the client side, as well. For instance, it may be more expedient to provide some filtering or reformatting of data on the client running a domain tool, and passing pre-filtered data to the server rather than passing raw data and having it reformatted on the server side. The distribution of these functions among servers and clients is dependent on implementation decisions, especially dependent on tools and products selected to implement the DBMS and PDM infrastructures, as well as the set of implemented domain areas.

The database tier 621 provides the persistence functionality using an Object Relational Database Management System (ORDBMS) 622 to store structured and unstructured data. The preferred embodiment utilizes the Oracle® 8i database because it provides many standard database management system capabilities. The database schema is implemented using the product-model as a basis. All essential-data, as defined b the product model is contained in the database 622 in the database tier. Data queries, retrieval and storage is facilitated by the information management services in the services tier and the database tier on the server side.

The common object request broker architecture (CORBA) 613 interfaces legacy and external systems 603 to the CEE. Other technologies such as XML (extensible Markup Language) may be used as well. The Java™ Object Servers 613 also interface with the HTTP Web server 617 to communicate with the browser client 602. Java™ Remote Method Invocation (RMI) 619 provides the communication mechanism between the Java™ Object Servers 613 and Java Applets 604 at the browser client 602.

Even the best applications become unusable if not presented to the user in a consistent and well thought out environment. Therefore, in the preferred embodiment of the present invention, certain user requirements drive the user framework design, i.e., domain user interface, and how those requirements were addressed.

The enterprise consists of many different programs, or projects, where a program is some defined scope of work, such as a contract or an internal development effort. A typical employee works on many different programs in the course of a career, and may support multiple program at the same time (see FIG. 5). Programs are often supported by geographically dispersed teams of customers, contractors and suppliers.

Figure 7:
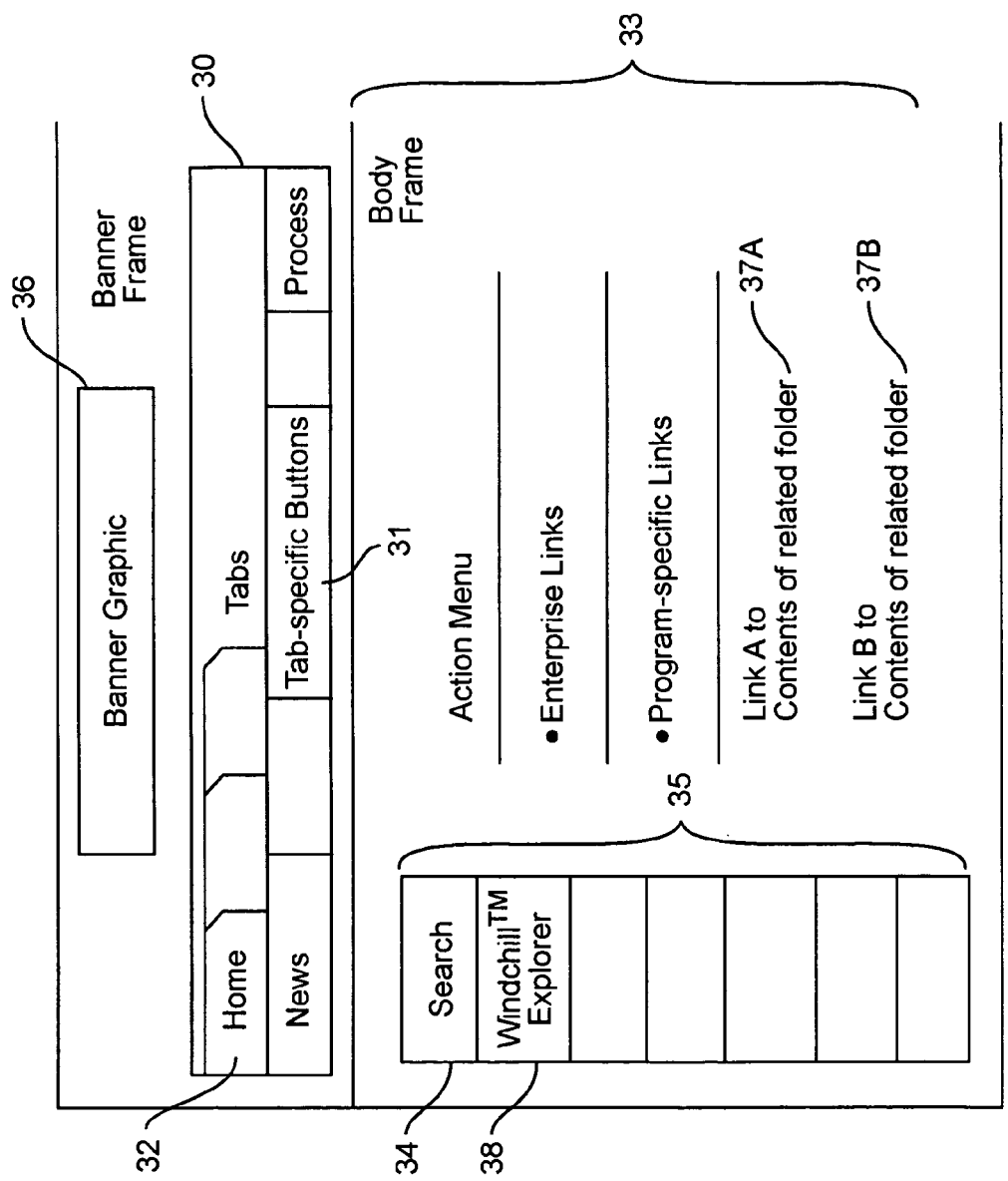
FIG. 7 shows a flexible, standard and customizable home page for a program using the present invention for collaboration.

Therefore, the most basic requirement is to provide access to program information across a diverse team of people. Web technology is used to solve this problem. The user interface centers around a program home page, as shown in FIG. 7.

Some members of the enterprise will use the CEE largely to find and review information. Many users will manipulate documents. Some will be "power users," performing operations such as building complex product model structures. The environment needs to provide the appropriate type of access for all.

Thus, the program home page supports several different ways to access information. Referring now to FIG. 7, the tabs 30 and buttons 31 at the top of the page represent a two-level hierarchical view of the information structure. The tabs 30 represent high level categories. Each tab has a set of buttons 31 or menus providing the next lower level breakdown. The "home" tab 32 contains some of the most basic information categories, such as the "process page" 33, as shown in the body frame.

If a user doesn't know which category to look in, or is looking for information that may span multiple categories, the "search" option 34 is always available at the top of the navigation sidebar 35. The preferred embodiment has two types of searches. It would be apparent to one skilled in the art how to develop additional search schemes, as desired. The first searches for an arbitrary keyword specified by the user. The second searches by type of object (such as document, change request, etc.). Attributes appropriate to the type are presented, and the user fills in desired values for any or all. Search results are presented as a list of hyperlinks to objects. Clicking on a link displays the properties of the object.

The Windchill™ tool also provides an information explorer similar in appearance to the explorer provided with Microsoft® Windows™. From it, users can navigate to any objects in the Windchill™ tool database and manipulate those objects in any way that their access permissions allow. Access to the Windchill™ explorer is provided through a link in the sidebar 38. In general, the explorer presents more information and options than most people need, and it is not intended to be the primary means of using the CEE. It has its role, however, and some of the "power user" or less frequently used operations may only be available via this mechanism.

Finally, users may have different information needs based on the role they play on a program. A software engineer may want a link to a Java™ site, and quality assurance personnel may frequently access an audit database. The present invention declutters a user's view by omitting unnecessary information based on the role of that particular user or membership in a specific team, i.e. role-base and team-based desktops accessible via the "desktops" and "teams" tabs). Clicking on the "desktops" tab presents the user with a menu of supported roles, such as "Software engineer." Selecting a role returns a page with information and links appropriate to that role.

Each program owns its own set of logical folders in the Windchill™ tool environment. In this way the correct set of information can be presented on a program's web pages. For example, the banner graphic 36 includes a program identifier and unique graphic. The links 37 at the bottom of the page are to objects in the program's related folder (process, news, etc.).

In addition to program folders, most objects in the environment are assigned to a program when they are created. This provides an additional benefit, i.e., policies for each program can be defined up front concerning how different types of objects are to be handled on the program, and then this complexity is hidden from the user. For example, program "XYZ" may have two types of change management processes: one for "customer" change requests and one for "internal" change requests. The program may want each type to be filed in a different folder and follow different life cycles (processes) with different sets of participants. An administrator defines and stores that policy information once, only changing it if the policy changes. Then when any user creates a change request object for the "XYZ" program, the user just has to choose between "customer" and "internal" types, and the program's policy decisions are applied to the object automatically.

Because users support multiple programs and/or move from program to program, it is important that the environment look consistent from one program to another. Thus, in the preferred embodiment, the high level folder structure is the same for all programs, and is mirrored by the tab/button structure of the web page. While programs are not all the same, the benefits of making the program entry points look the same outweigh the restrictions. Below that level, programs are free to add subfolders as necessary to meet their needs.

In addition to consistent page organization, consistency in the look of each page is maintained. This was facilitated by use of the Windchill™ tool's dynamic HTML generation mechanisms. When a user requests an HTML page via the browser, the hyperlink points to a template for the actual page that will be returned. The template contains Windchill™ tool "script" calls that get replaced with dynamically generated HTML. For example, the template for the notional "process page", as shown in FIG. 7, contains a script call to "display folder contents." A piece of custom Java™ code determines the appropriate folder for the page and program, and replaces the script call with HTML links to the contents of the folder.

That not only means that the "process" page looks consistent from program to program but that it always mirrors the program's current "process" folder content reflecting changes dynamically every time the page is reloaded.

While one of the goals was consistency, programs need to add their own unique links to the pages initially given them. While allowing programs to change the standard pages creates a maintenance problem, the alternative may be too restrictive. Dynamically generated HTML empowers the programs to address such problem. Rather than allowing each program to modify the HTML pages, an area of each page is reserved to display program links. Each program is provided with a text file on the web server containing a list of links associated with each page, and the HTML page is dynamically built based on the content of the file. A program administrator can add a link to the file, and it will be displayed an the designated page the next time the page is accessed. This also means that a program can build another whole tier of supplementary pages, and link them to the initial pages via this mechanism. The result is a clear division of maintenance responsibility between CEE administrators and program administrators.

In the design of the user framework, the ease of setting up a new program was considered. According to the preferred embodiment, the mechanics of the process requires approximately two (2) hours. The program name is added to a Java™ table which causes it to appear in the program selection menus in all of the system user interfaces. A graphic is provided to identify the program on its web pages. Due to the dynamic HTML generation, no HTML modification is required. A Windchill™ tool utility is used to load the program's standard folder structure.

Appropriate links for the program's web pages and policies for handling of objects belonging to the program are identified. All of this is captured in property files on the web server. As the CEE capabilities expand to provided additional functionality, the scope of this effort continues to grow. It would be apparent to one skilled in the art how to elicit knowledge from the disparate groups and members of the enterprise in order to define and identify policies and customize web pages specific for a program.

In implementing a CEE, one may choose to develop functionality incrementally. Integrating document and change management in a CEE, among other tasks, provide certain advantages and can improve a program's life cycle greatly. Once a subset of domain areas are integrated, others can be integrated in a manner consistent with funding, user resistance or compliance, etc.

At first glance, document management seems to be a fairly simple application; however, it is complicated because documents play many different roles. A document may be an informal record of a meeting or it may be part of a controlled baseline or deliverable to a customer. The last two roles imply very different attributes and processes from the first one. Roles can also apply in combination. A document may be both part of a design baseline and deliverable to a customer. Trying to build document life cycles that take all of the possibilities into account can quickly become complicated.

Therefore, information about the roles played by documents is represented separately from the documents themselves. For example, as part of its baseline role, a document can have a relationship to one or more baseline objects and perhaps some number of change management objects (such as change requests) that represent the change activity that the document has undergone. As a customer deliverable, a document has a relationship to a "contract data requirements object" (or set of objects) that represents its state with respect to its deliverable role. This allows document attributes and life cycles to stay relatively simple. The associated role objects carry attributes and life cycles appropriate to their purpose. For example, the life cycle of the change request (and other related objects) automates the change management process. A document's relationships to its role objects can be used to build checks into the document life cycle such as disallowing the release of a document if its associated change management objects are not in a completed state.

Baseline change management is one of the most widely used processes in an enterprise and is therefore a high priority to implement early. Basically, changes are proposed via change requests which then flow through a series of gates. At each stage, more detail is added, and the request is reviewed for approval to proceed to the next stage. In this way, inappropriate requests can be screened out early before much effort has been expended to analyze them.

The inventors found that Version 4.0 of the Windchill™ tool fit well for the needs of the preferred embodiment. Supported classes include.

"Change issues" and "Change requests" to suggest a change in varying amounts of detail;

"Change investigations" and "analysis activities" to capture information when investigating the nature of the change;

"Change proposals" to propose an approach to the change;

"Change Orders" to order implementation of a change; and

"Change activities" to track change implementation.

Another goal in change management is to automate the process to be flexible enough to meet the needs of both small and large programs requiring varying degrees of formality. One issue is that the number of reviews and review participants at each stage can vary widely. A review board might determine that an additional piece of information is needed, and might postpone any decision until the information is available. That could happen multiple times before the change object moves to the next phase of its life cycle.

This problem is solved by utilizing an "action item" class. An action item allows the originator to forward, and monitor status of, one or more business objects to one or more assignees for action. An originator creates an action item and edits it until it is ready to send. The assignee(s) receive notification of the action item through their personal worklist and e-mail, with hyperlinks to the action item object. In the case of change management, action items can be used to forward a change request to someone to provide more information, and to change board participants for review. Action items represent a common activity pattern found in many business processes.

A concept key to the product-centric information view is the ability to share and reuse product information across programs. The preferred embodiment uses a product catalog. The product catalog of the present invention provides an enterprise wide design information library for components and related information. Information contained in the catalog describes projected or currently available mechanical components, complex assemblies, COTS hardware, COTS software, developmental hardware, developed software, or other products assembled to build and operate a complex system. The product catalog is managed through complex applets and HTML interfaces which provide tools for structuring and managing component information, searching and navigation, and the referencing of component information to construct one or more program specific designs.

The preferred product catalog implementation supports hardware parts and complex assemblies and has been designed for extensibility to other component types. Master part characteristics managed within the catalog include design, cost, reliability, production, and operability characteristics, as well as related modeling information. These characteristics are propagated from the catalog to unique design representations as subscribed to by each design team.

Much of the CAIV implementation, as described in U.S. patent application Ser. No. 09/631,694, supra, is devoted to porting the production cost and spares/repairs cost projection models into the Windchill™ environment and providing a robust user interface. A graphical user interface to create hardware parts and enter the complex attributes required to model life cycle cost were developed. Some of the referenced attributes in the product catalog vary based on their usage in each program. For example, the mean time between failures for a part is fixed in the catalog, but how many times that part is estimated to be repaired before being scrapped is a policy that varies by program. The preferred embodiment provides defaults for all part attributes in the catalog and allows a referencing program to override some of them. This capability also enables similar variability in treatment across a program.

In addition to porting the algorithms for the production cost and spares/repairs projection reports, a reporting mechanism is implemented. The results of the report are stored as comma-separated values in a text file inside a document object in the Windchill™ tool. The user can download the report content and import it into Microsoft™ Access for report formatting. This is done to allow programs the flexibility to support many different report formats without having to write new software each time. The document object in the Windchill™ tool can be saved or discarded according to the program's needs.

The preferred embodiment of the present invention is a CEE application that facilitates communication of product-related information to the various engineering disciplines and enterprise projects from a centrally managed location. It provides systematic reuse of product-related information across the enterprise. Through a process of maintaining the information in the product catalog, technologists, architects, and product specialists are able to share the most up-to-date product developments to a larger user community. Users have access to the most current, accurate, and complete product information available through the product catalog.

In order to allow users across multiple disciplines and various projects to share the same product information, it may be desirable for the behavior of a part to differ depending on how the part is used, and by whom. For example, parts are often rated on their "mean time between failures" (MTBF). A part may have a rated MTBF of 100,000 hours in a benign ground environment. However, if that part is intended to be used on a system located in a space flight environment, its MTBF might actually be 120,000 hours. To accommodate these requirements, the present invention provides a framework to support the sharing of common enterprise-level information across a large user community, as well as the capability for clients of the product catalog to specify project-specific behaviors for a part.

In order to enable the product catalog as part of the CEE, a "part concept" was first developed. This part concept is flexible enough to evolve to differing business needs, and in the preferred embodiment, is implemented in an object oriented context. A "part" is an object that contains all of the enterprise-level information needed to characterize the base behavior for a particular part. The "part reference" is an object that allows a project to specify additional constraints on the behavior of the part. A part reference is just a special part with distinctive characteristics; some of its properties are defined by a part object, referred to as its "Refers To Part" object. In general, the "Refers To Part" object is defined and controlled by the product catalog.

Figure 8:
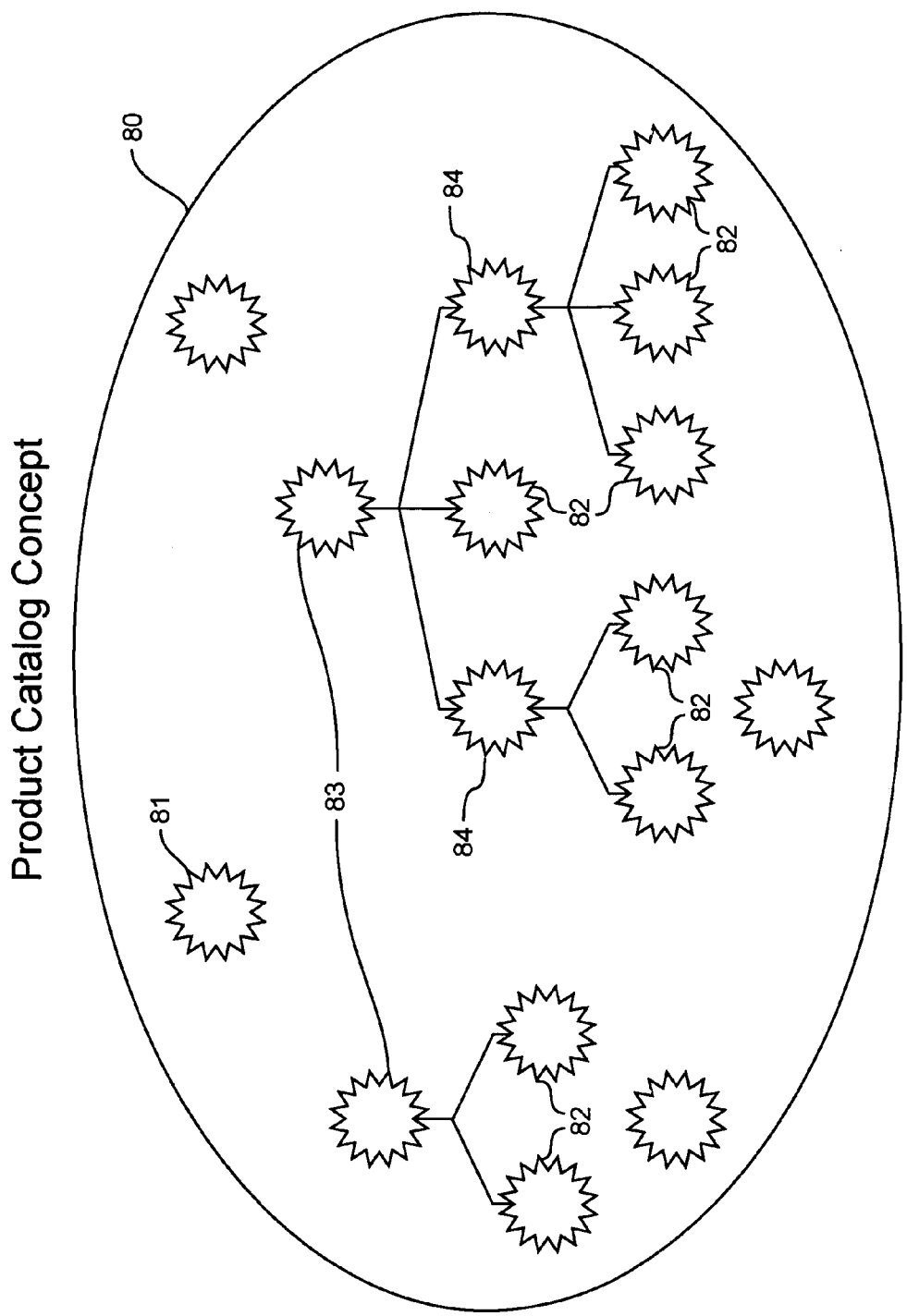
FIG. 8 shows the high level concept for the product catalog, according to the invention.

Referring now, to FIG. 8, the product catalog concept is shown. The product catalog 80 consists of all parts 81 that may be shared at the enterprise level. These parts may include both leaf-level parts 82, such as RAM memory chips, as well as complex assembly parts 83 and 84. The complex assembly parts 83 and 84 may contain simple parts 82. Since the product information stored in the product catalog is shared information, any updates to it are made via a controlled process. In the preferred embodiment, the parts within the product catalog are managed by a group of product specialists, or technologists. Project engineers reference parts from the product catalog to build their product model for a specific project. If an engineer identifies a part that does not exist in the product catalog, a project-level part may be created by the engineer, or alternatively, an enterprise-level part can be created by using a product catalog change process to obtain changes and updates to the actual product catalog. This change process may vary by organization, but requires that all product catalog changes be planned and controlled.

In the preferred embodiment, the change process to add (or modify) a part to the product catalog comprises three steps:

1. engineering controls the part while in its "in-work" state and develops or modifies the part to desired specifications;
2. an appropriate technologist determines whether the in-work part's attributes are technically accurate and that there is adequate justification for placing the part in the product catalog, and if so, approves the in-work part and places it into the product catalog as an "under-review" part;
3. a Catalog Control Board (CCB) comprising appropriate technologists and representatives from affect projects determines whether the part under-review will be promoted to the "release" state. Once a part has been released, it may be referenced outside of the product catalog. In other words, it can be referenced anywhere that the product information managed within the catalog is applied. This is typically on a "program" applying that part within its product design or designs. The "program" engineering team will reference the product catalog part to create a proxy representation of it within the context of their design. This allows them to benefit from immediate (but in some cases selective) access to the most recent information for that part as defined in the catalog and to elaborate on additional information to completely describe that part in their design. Multiple "programs" or designs may, and probably will, reference the same part in the catalog, even thought they may apply it in different ways, even in the same design. Thus, the nature of the change or addition determines the level of coordination necessary for promotion. For example, creation of a new part may require little more than electronic notification of its availability, while a change to a widely shared part is scrutinized more closely to determine the impact on affected projects already using that part.

For purposes of describing the preferred embodiment of the present invention, the following definitions and assumptions are made:

Technologists. Technologists are the knowledgeable engineers responsible for setting up and maintaining the product catalog. These specialists have expertise knowledge in some range of hardware or software products, and are able to characterize those products that are both currently available as well as future trends. They operate across project boundaries to make product information reusable and reliable.

Cognizant technologists are responsible with keeping up-to-date with current products, maintaining an awareness of emerging technologies and following market trends in their area of expertise. In many cases, this requires consistent surveys of the market place and developing close relationships with suppliers. They are members of the common products working group, develop strategies and select products for technology insertion, and sustain interaction with lifetime support engineering.

Project engineers: The project engineers maintain a project's product model within the CEE. The product catalog will be one of the main tools a project engineer uses to design his product model. Instead of designing from scratch, the engineer has the ability to search the product catalog for parts and part assemblies that match his/her performance requirements. Upon finding the appropriate part, a part reference to that part would be created for the project. Project engineers work with the technologists to identify and propose updates to product catalog parts as needed, and may also initiate additions to the product catalog. Prior to releasing a project's product model, all potentially reusable parts within the product model are to be incorporated into the product catalog.

The project engineers are responsible for using the part contained within the product catalog to build their product model. Ideally, they would work with the technologists at the commencement of the project to identify parts to be utilized from the product catalog. As the engineers design their product model, they will search for and use parts from the product catalog. If they encounter a situation where they cannot find an applicable part, they are able to define parts for use within their project. While doing this, they are responsible for identifying parts which should be added to the product catalog.

The project engineer has the ability to use both part and part reference objects to build a product model. FIG. 4 is a simplified example of how a project engineer would use the product catalog to design a hardware-oriented product model.

Using the "new part" interface, the "technologist" creates a projected system component, a "hypothetical part," including its name, an identifying number, availability date, and an associated description. The new part represents a component that is unavailable commercially but one that is projected to be commercially available in the future.

Based on historical and projected behavior, the "technologist" uses the "update part" interface to specify associated performance factors, complexity factors, rates of inflation, technology doubling intervals, and other intrinsic technology driven information for the hypothetical part.

A "supportability engineer" uses the "update part" interface to specify associated intrinsic reliability, maintainability, and availability information for the hypothetical part. These parameters include passive mean-time-between failure (MTBF), spare delivery on arrival dates, rated MTBF information and associated environmental behavior information.

The "cost engineer" uses the "update part" interface to review the historical and projected costing information (rates of inflation) provided by the "technologist." Cost models are then associated with the hypothetical part based on its category of technology (single board computer, commercial server, operating system, middleware, etc.). The "cost engineer" or "technologist" will also update the hypothetical part information with a projected base price corresponding to a "model year."

During a proposal, a "systems architect" designs a high level system architecture incorporating several applications of the hypothetical part using a commercial enterprise modeling tool product. The "systems architect" is aware of available hypothetical parts in the product catalog and incorporates these into the projected systems architecture. Once the "systems architect" has completed the design, it is saved within the CEE, creating a corresponding product model that references the hypothetical part in the product catalog from the places in the product model structure where it is applied.

A "design engineer," working on the proposal, refines the specification of the hypothetical part by specifying application-specific information such as the operational environment, and repair turnaround times, replacement times, and maximum number of allowable repair attempts, and shipment times for the part based on support concept for the program.

When completed, the product model represents a "model year" for the product design including the "hypothetical part" representing the projected commercial component in its design context. At the appropriate level of maturity in definition, the product model in "baselined". During the period between baselining and the model year time of application, the technologists, cost engineers and other disciplines may modify the intrinsic part information based on technology behavior, economical data, or refined understandings of the component technology. The product catalog may be updated with this information with this information updated in the product model where not overridden by the "design engineer."

As true time approaches the "model year," the "design engineer," working in collaboration with the "systems architect," conducts a trade study evaluating commercially available solutions providing the comparable functionality as the "hypothetical part." Once selected, the "COTS part" is added to the product catalog and updated by the "technologist," "cost engineer," "supportability engineer", and other disciplines to complete the specification of the commercially available part. A "procurement engineer" may be asked to request several quotations on the COTS part. These quotations are imported into the CEE by the product catalog from the procurement system (a manufacturing resource planning system) and associated with the COTS part, by reference being associated with the part as applied within the product model. The "design engineer" updates the product model with the selected component and uses the change management process to introduce the selected part into the new design baseline as a replacement for the "hypothetical part."

As "procurement engineers" purchase the COTS part, the financial history is periodically loaded into the CEE and associated with the part in the product catalog. When costing models using the financial history are exercised by design engineers in the conduct of their activities, higher precision historical information may be applied. As the COTS part is included in actual testing and fielded systems, failure information can be refined for the part by "technologists" and "product engineers" through the product catalog, propagating higher fidelity information to all programs applying that part as a component in their systems.

Figure 9:
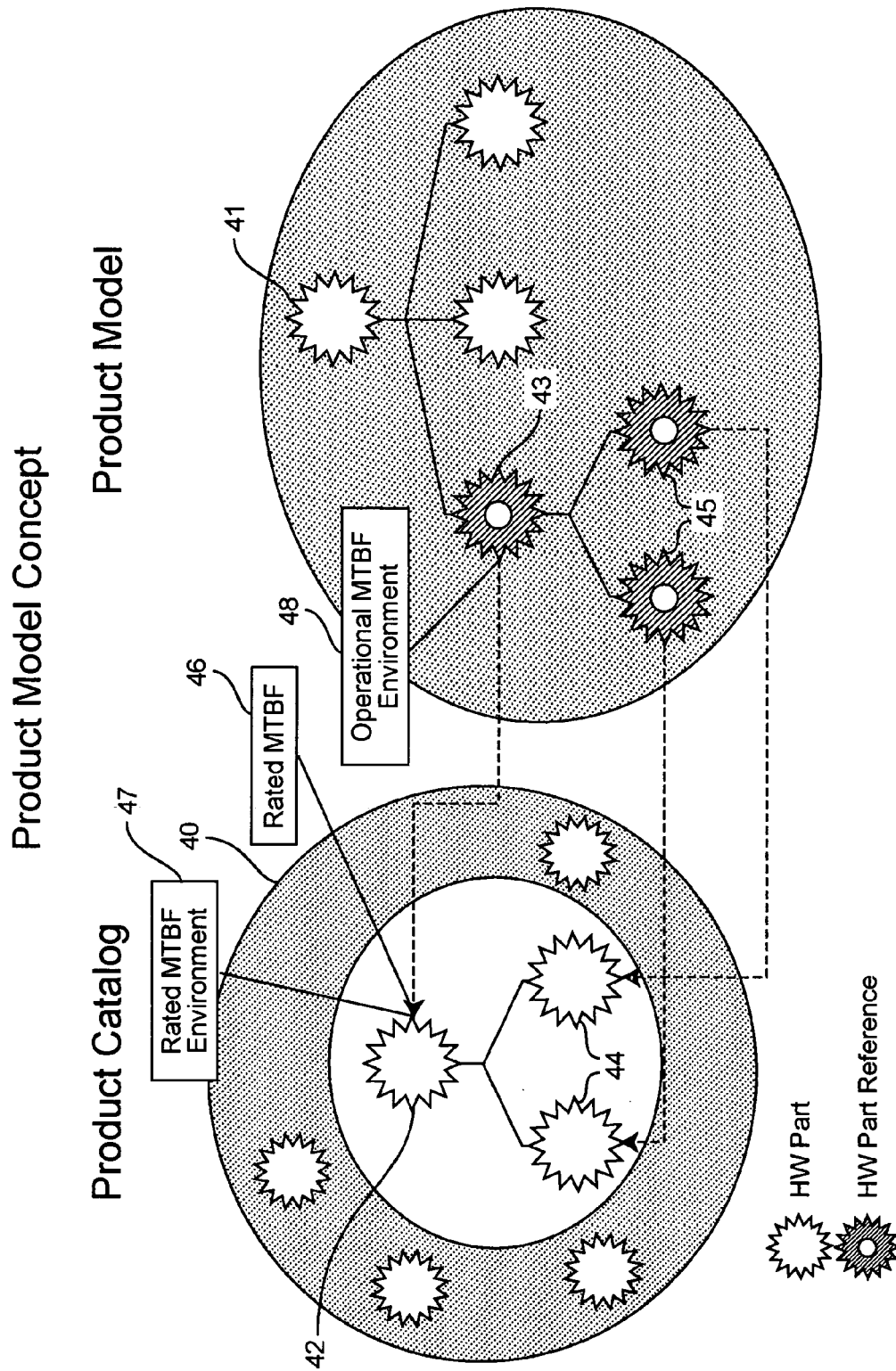
FIG. 9 shows a simplified representation of how parts in the product catalog are referenced by a Project.

Referring now to FIG. 9, suppose the product being designed is a display workstation. Since the product does not exist yet and is possibly unique to this project, the first part defined by the engineer would be a hardware (HW) part 41 characterizing that product. Suppose that a necessary component of this workstation is a processing unit. The engineer searches the product catalog for a processing unit that fits his requirements constraints. Searching can be accomplished through either a full text search of information describing the part or through exercise of a search engine managing collections of customized descriptive information. The preferred embodiment will enhance these capabilities with a level of processing that will present the user with the capability to structure the search according to the engineering domain, e.g., software hardware, electrical, computer, mechanical, operations, etc. The user finds a part 42 for an "XYZ" processor to power his workstation. The engineer creates a HW part reference 43 that references the XYZ part 42 from the product catalog 40. If the part being referenced is an assembly of parts, the engineer also would automatically get references 45 to those sub-components 44. Each of the HW parts referenced from the product catalog has their rated MTBF 46 and rated MTBF environments 47 predefined. However, the rated MTBF environments 47 are different from the expected operational environment 48 for his system. So the engineer edits the project's HW part reference objects 43 and 45 to specify the correct MTBF environment for the parts.

Once the product model has been defined in the CEE, the engineer could now apply many applications to it. For example, an engineer may want to perform some quick analysis on the project system to see if it has the correct operating parameters. One important characteristic for this system might be its expected MTBF. With project-specific characteristics defined in the HW part references 43 and 45, an appropriate MTBF estimation model can be run the against his product model to achieve the desired performance parameters.

Applications are interfaced to the CEE in accordance to how they are expected to be applied by the user. Some may be interfaced through simple integrations of the URL (uniform resource locator) to the external application. Others may use MIME (Multi-purpose Internet Mail Extension) to launch the application on the client with the corresponding input file. Another mechanism is to create a formatted text delimited output file that can be used as input to the external application using a server side application. This can be coupled with workflow applications to extend the precessing to be automatically performed or to launch the external application with the formatted file. A tight integration can utilize a custom server side application that generates a formatted input file, in the format expected by the application, moves it to the client, and launches the application with the generated file. Inverse interfaces from the application to the CEE can be established to capture information from the application into the CEE product model.

Implementing the product catalog concept in a CEE, requires the definition of a "part paradigm" that is flexible enough to adapt to changing business needs. This paradigm encapsulates all of the necessary information to be useful to the large user community. As described above, the preferred approach is to model a part using a combination of a part and part reference. In the CEE of the preferred embodiment, the part is defined by a set of attributes called its characteristics. These characteristics are separated into two categories, master and project-specific. The master characteristics are behavioral attributes of the part that are consistent, independent of how it is used. In other words, these values will not change no matter which system, project, or platform it is used on. Project-specific characteristics define how the part will behave and are dependent on how the part is used within a project. These characteristics can be further broken down into global and local project-specific characteristics. Global characteristics are defined for the part's use across the whole project. These values are consistent for the project no matter how or where it is used. Local characteristics are defined at a part-by-part basis. These values may change depending on many factors such as the operational environment, the location in the system hierarchy, which system it belongs to, etc.

Generally, the master characteristics are defined on the part, the project-specific on the part reference. However, the part also contains a set of project-specific characteristics. This set is considered the "default" project-specific characteristics, and are used as the default values for all part references that refer to that part. The project will have the option of specifying which values they would like to retain control over for that attribute. In the preferred embodiment, this is done by marking an "override" box for the attribute. This creates a mechanism in the part user interface to allow the user the flexibility to select whether or not the derived part inherits the corresponding master characteristic from the part, or define varying values for the characteristic. It allows for localized definition, but with a loss of benefitting from the referenced part for the values. Those attributes not marked as being an override will be automatically updated to match the "default" values stored on the referred to HW part.

An analogous example of designing a product incorporating a COTS software product illustrates the product catalog's extensibility to non-hardware components. While this example is for software components, other types such as functional, manning, and operational components may be applied as well.

The COTS software product may or may not have been yet applied in the context of a design across the enterprise. The software engineer searches the product catalog for software components providing the required functionality, in this example a realtime CORBA Object Request Broker. Searching can be accomplished through either a full text search of information describing software components or through the exercise of a search engine managing collections of customized descriptive information. The preferred embodiment enhances these capabilities with a level of processing that presents the user with the capability to structure the search according to the engineering domain, in this case software engineering. The user finds a "software part" for realtime CORBA ORB and creates a "software part reference" that references the "software part" from the product catalog. If the "software part" is an aggregation of unique software products or product components, the engineer would get references to those sub-components as well. The software engineer may create several references to the CORBA ORB "software part" such as in segments of the product design where the hosting processor is UNIX-based and others that are Microsoft Windows-based, or in those hosted by different processor classes (200 MHZ Pentium III and 600 MHZ Pentium III). Each of the "software parts" has rated performance information which can be derived for the two different operational environments, Unix and Windows, when further defined as a "software part reference." The Software engineer will update the corresponding "software part references" to reflect the corresponding operating system environment.

Once the product model has been defined in the CEE, the software engineer can apply many applications to it. For example, the software engineer can conduct system performance modeling to derive system timeline performance to ensure that the performance of the CORBA ORB meets requirements in the context of the heterogenous system (UNIX and WINDOWS). Interface information captured in the product model contributes information to the performance analysis scenarios to load and exercise the ORB performance model(s). The software engineer can also define candidate homogenous solutions (UNIX or WINDOWS) that can be compared in performance to justify the solution. The software engineer can also exercise costing software to generate life cycle costing estimates for the proposed system. The cost and performance information can be imported into a trade study tool such as Microsoft Excel or ExpertChoice™ for assessment.

Master and project-specific characteristics are analogous for the "software part" and "software part references." Cost models, technology information, performance descriptions, reliability information, etc. is specified as master characteristics. Implementation specific information such as functional interfaces, operating system, host platform, etc. are project-specific.

The use cases applicable to the HW part will be the driving factors behind how it is characterized (what its attributes and relationships are) in the CEE. In initial development efforts for the prototype CEE, as described in U.S. application Ser. No. 09/631,694 entitled "Collaborative Engineering Environment For Product-centered Lifetime Support," supra., the Production Cost by Configuration and Projected Spares and Repairs Cost use cases were the driving factors in the characterization of the HW part. An exemplary subset of the defined attributes are shown in FIG. 10.

Figure 10:
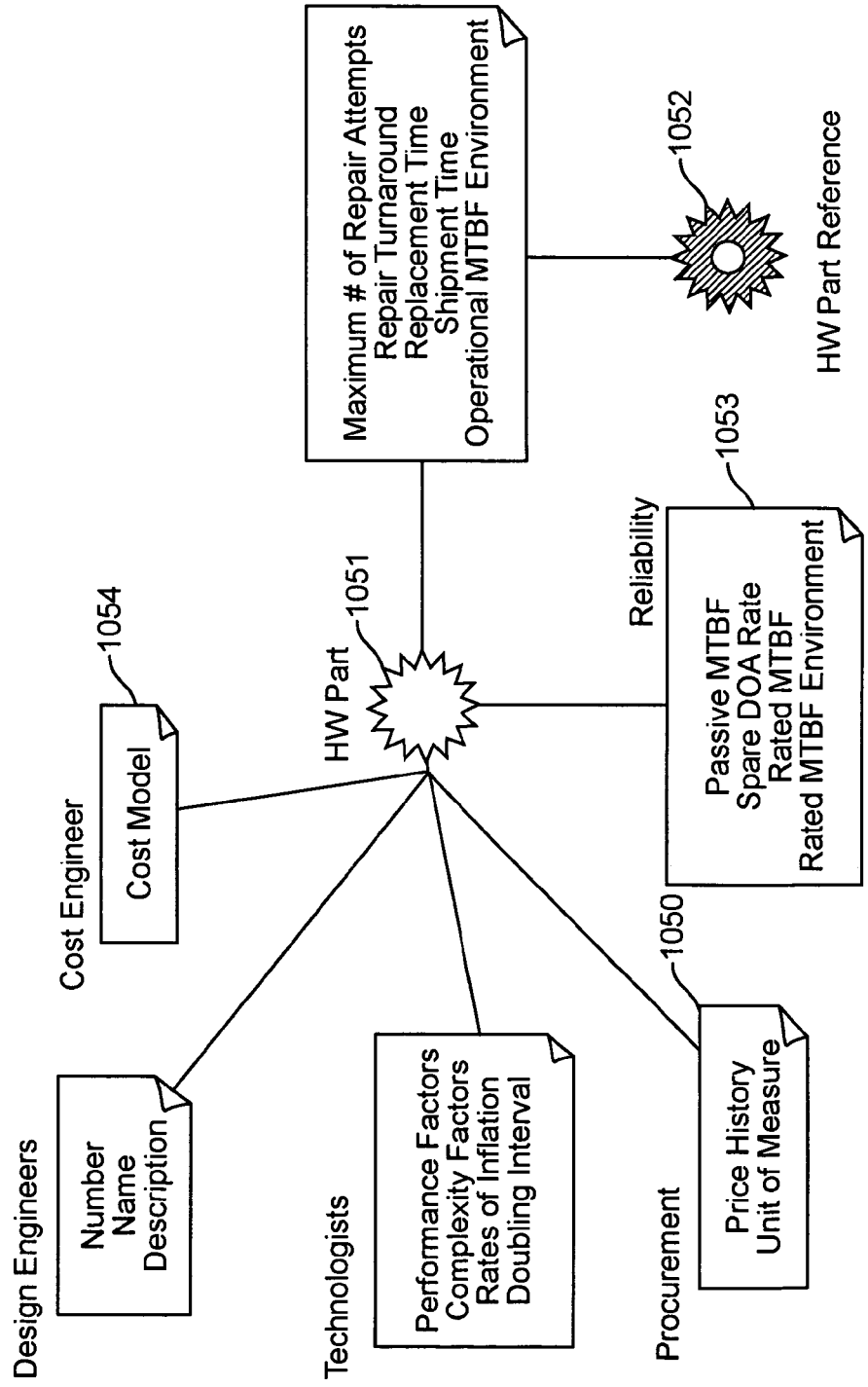
FIG. 10 shows information related to a part in the product catalog and a project part reference.

Referring now to FIG. 10, the HW part 1051 seems to have more information characterizing it than the HW part reference 1052. However, the HW part reference 1052 actually has more detail. A part reference is just a special part which has a portion of its attributes defined by the part that it references. In this case, these characteristics include attributes such as the actual purchase order Price History 1050, Rated MTBF 1053, applicable Cost Models 1054, etc. In general, these attributes are defined on the HW part 1051 located in the product catalog, and programs have access to these values by creating a HW part reference 1052 to that HW part.

An ongoing effort within organizations may be to develop a Cost As an Independent Variable (CAIV) capability. For example, two CAIV use cases are chosen: Production Cost by Configuration and Projected Spares and Repairs Cost by Configuration, as illustration.

In the Production Cost by Configuration use case scenario, a cost engineer requests a report of the projected cost for a full configuration of physical parts at a given point in time. There are two pre-conditions that must be met for this use case; the configuration must be defined within the product model, and the physical parts that make up the configuration must have all the necessary attributes required to apply the applicable cost model. Once these conditions are met, the cost engineer can specify the configuration and "buy point date" from which to perform the computation. Optionally, a "fixed year date" can be specified which would allow for the adjustment of the cost based on the appropriate escalation/de-escalation rates for those years. A buy point date is a purchase date for the selected part. Fixed year dates are purchase years for the selected part. For every part in the specified configuration that is marked to be costed, a projected cost will be appear in the report.

For the Projected spares and repairs cost by configuration, a two-step process is required. First, a base cost is calculated for the parts that are contained within the configuration. This calculation is normally accomplished by running the production cost by configuration use case against the product model. Then, a simple repair model is applied to the configuration to determine an estimated spares and repairs cost for it.

Instead of having the information scattered across multiple databases, the product catalog allows the HW part to be defined in a single location, with each subject-matter expert providing the appropriate information for that part. It would be apparent to one skilled in the art how to allocate responsibilities to the various organizations in an enterprise to provide the information needed to execute the desired use case scenario.

The preferred embodiment of the CEE, has the capability to allow the leveraging of general enterprise information to the user community. Various engineering disciplines provide global behavior models that can be applied to parts within the product catalog. For instance in the CAIV example, the cost engineers might supply the various models used by design engineers to cost their products. The reliability engineers could provide the Repair models to be used to perform spares projections.

In systems of the prior art, the cost engineers would typically have to spend valuable time going from one organization to the next, attempting to collect and weed through the information needed for reports. They would have to rely on individuals from the organizations to provide the data, and then would have to make sense of the information they received. However, using the present invention, all of the data would already be provided by the appropriate organizations and captured in the CEE. For example, the product model is designed by the project engineers; the actual purchase order price history is provided by the procurement group; the technologist provides the HW parts' performance factors and the cost model parameters; and the reliability engineers input the reliability information. Using the preferred embodiment of the present invention, applications are able to access the required information from the CEE, and return the appropriate reports to the cost engineers.

The product catalog concept and its associated processes enable the timely propagation of accurate and current information regarding critical design elements to users across an enterprise. The product catalog acts as a resource multiplier, propagating the knowledge and expertise of critical engineering resources to a much larger engineering community. At a project level, maintaining both the product catalog and product models within the CEE enables collaborative multi-disciplinary activities. Through the on-line referencing of the managed system and product information, activities such as life cycle cost assessment, spares projection, performance analysis, and program status tracking can be performed. The associated product model enables the employment of the corresponding product behavior for multi-disciplinary engineering assessment of the design. In these ways, scarce subject-matter expertise can be leveraged and exploited in an efficient and reliable manner within the unique constraints of the rapidly changing COTS technological environment.

While the invention has been described in terms of its preferred embodiments, those skilled in the art will recognize that the invention can be practiced with modification within the spirit and scope of the appended claims.

Having thus described our invention, what we claim as new and desire to secure by Letters Patent is as follows:

1. A computer implemented product catalog for use in a web-centric collaborative engineering environment (CEE) for providing an inter-enterprise collaborative mechanism for organizations developing and maintaining complex system products, the CEE providing a federated architecture linking multiple systems and applications together to enable collaboration among enterprise members, comprising:
   an object oriented database management system (ODBMS) managing an associative object model for providing a persistent understanding of product and program information, assets and tools available in the enterprise;
   a plurality of part objects forming a product catalog, the part objects being defined by the associative object model and stored in the ODBMS, wherein each part object has intrinsic characteristics corresponding to a plurality of default values, the product catalog providing an application independent means for supporting engineering tools through intelligent interfaces;
   means for generating part references, where a part reference refers to a corresponding part object in the product catalog, and wherein the part reference has characteristics customized for a project that override or extend the intrinsic characteristics of its corresponding part object; and
   means for linking members of the enterprise with part objects and customized part references via a collaborative engineering environment (CEE), the CEE having a framework for collaboration which provides access control, security, search mechanisms, concurrency control, versioning, information structuring, information mapping and exchange, wherein the information available to each member is information necessary for the member to complete role and team based tasks, and wherein the linking means comprises a plurality of tools, each tool communicating information with the ODBMS.

2. A system as recited in claim 1, wherein a part object is a collection of one or more part objects.

3. A system as recited in claim 1, wherein part objects represent commercial-off-the-shelf (COTS) hardware, electrical, software, or intangible or abstract component types.

4. A system as recited in claim 1, wherein the product catalog supports part objects representing commercial-off-the-shelf (COTS) hardware, electrical, software, and intangible or abstract component types.

5. A system as recited in claim 1, wherein the product catalog provides a single point of information management with unlimited application by reference.

6. A system as recited in claim 1, wherein the CEE enables members of the enterprise to capture technology and model information and associate the captured information with a system component for entry into the product catalog.

7. A system as recited in claim 6, wherein the parts and components in the product catalog are extensible to an existing user community in an enterprise, the user community requiring customization of parts for use in projects associated with the enterprise.

8. A system as recited in claim 1, wherein the product catalog provides a single extensible interface for enterprise member information management systems.

9. A system as recited in claim 1, wherein the product catalog supports part objects representing projected or hypothetical components.

10. A system as recited in claim 1, wherein intrinsic information of a component, the component being represented by one or more parts in the product catalog, is augmented with implementation specific information.

11. A method for customizing a product catalog for use by a project in a collaborative engineering environment (CEE) which provides an inter-enterprise collaborative mechanism for organizations developing and maintaining complex system products, and provides a federated architecture linking multiple systems and applications together to enable collaboration among enterprise members, comprising:
   generating a product model for the project, wherein the product model defines project related informational elements and their corresponding characteristics, and wherein the project related informational elements may differ based on domain area;
   identifying elements (parts) existing in a enterprise-wide product catalog;
   customizing the existing parts for the project, by referring to default characteristics of the existing parts and when desired specifying overriding or extending part characteristics unique to the project;
   if necessary to fully implement the project product model, providing new parts for the product catalog; and
   integrating the project product model with domain-specific tools and application used by members of the enterprise, thereby enabling collaboration among enterprise members who have immediate access to information stored in the ODBMS by other members, wherein each member performs domain specific tasks using customized tools and applications and stores results of their performed tasks in the ODBMS, thereby allowing access of their information by other members of the enterprise.

12. A method as recited in claim 11, wherein the product catalog utilized for identifying parts in the identifying step and providing new parts in the providing steps comprises:

an object oriented database management system (ODBMS) managing an associative object model (product model) for providing a persistent understanding of product and program information, assets and tools available in the enterprise;

a plurality of part objects forming a product catalog, the part objects being defined by the product model and stored in the ODBMS, wherein each part object has default characteristics corresponding to a default environment;

means for generating part references, where a part reference refers to a corresponding part object in the product catalog, and wherein the part reference has characteristics customized for a project that override the default characteristics of its corresponding part object; and means for linking members of the enterprise with part objects and customized part references via a collaborative engineering environment (CEE), the CEE having a framework for collaboration which provides access control, security, search mechanisms, concurrency control, versioning, information structuring, information mapping and exchange, wherein the information available to each member is information necessary for the member to complete role and team based tasks, and wherein the linking means comprises a plurality of tools, each tool communicating information with the ODBMS.

13. A method as recited in claim 11, wherein the step of providing new parts, further comprises:

capturing technology and model information by members of the enterprise; and associating the captured information with a system component for entry into the product catalog.

14. A method as recited in claim 13, further comprising:

entering new part objects into the product catalog, wherein the new part objects correspond to system components associated with the captured information in the associating step.

15. A method as recited in claim 13, further comprising:

entering updated part object information into the product catalog when captured information results in necessary modification to an existing part and not identification of a new part, wherein the updated part objects correspond to system components associated with the captured information in the associating step.

16. A method as recited in claim 13, wherein the new or updated part objects are reviewed by at least one member of the enterprise having authority to accept or reject the part objects, and wherein if a new or updated part object is rejected it is not entered into the product catalog, but if a new or updated part object is accepted, it is entered into the product catalog.

17. A method as recited in claim 16, further comprising notifying members of the enterprise that new parts or part information are available.

18. A method as recited in claim 17, wherein the step of notifying further comprises automatically updating project specific parts and components with modified part information for updated parts.

19. A method as recited in claim 11, further comprising:

retrieving part information from the part catalog by members of a project within the enterprise; and customizing retrieved part information for use in a project.

20. A method as recited in claim 19, wherein the step of customizing further comprises:

maintaining desired default characteristics for retrieved part information;

overriding default characteristics for retrieved part information, as necessary to represent system components of the project; and extending part information with additional part characteristics, as necessary to represent system components of the project, the additional part characteristics being omitted from part information retrieved in the product catalog.

* * * * *